(12) United States Patent
Ruse et al.

(10) Patent No.: US 11,959,311 B2
(45) Date of Patent: Apr. 16, 2024

(54) VEHICLE DOOR HANDLE ASSEMBLY WITH RETAINING CLIP

(71) Applicant: Magna Mirrors of America, Inc., Holland, MI (US)

(72) Inventors: James A. Ruse, Allegan, MI (US); Brett A. Gorby, Rockford, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 697 days.

(21) Appl. No.: 17/247,010

(22) Filed: Nov. 24, 2020

(65) Prior Publication Data

US 2021/0156173 A1     May 27, 2021

Related U.S. Application Data

(60) Provisional application No. 62/941,124, filed on Nov. 27, 2019.

(51) Int. Cl.
*E05B 79/06* (2014.01)
*B62D 65/16* (2006.01)
*E05B 85/16* (2014.01)

(52) U.S. Cl.
CPC ............. *E05B 79/06* (2013.01); *B62D 65/16* (2013.01); *E05B 85/16* (2013.01)

(58) Field of Classification Search
CPC .......... E05B 79/06; E05B 85/16; E05B 85/10; B62D 65/16; E05Y 2900/531
USPC ......................................................... 16/412
See application file for complete search history.

(56) References Cited

U.S. PATENT DOCUMENTS

| | | | |
|---|---|---|---|
| 6,349,450 B1 | 2/2002 | Koops et al. | |
| 6,550,103 B2 | 4/2003 | Koops et al. | |
| 6,907,643 B2 | 6/2005 | Koops et al. | |
| 7,407,203 B2 | 8/2008 | Huizenga et al. | |
| 8,333,492 B2 | 12/2012 | Dingman et al. | |
| 8,786,401 B2 | 7/2014 | Sobecki et al. | |
| 8,801,245 B2 | 8/2014 | De Wind et al. | |
| 8,991,880 B2 * | 3/2015 | Yokoyama | E05B 85/10 292/336.3 |
| 9,353,557 B2 * | 5/2016 | Sanborn | H03K 17/962 |
| 2010/0007463 A1 | 1/2010 | Dingman et al. | |

(Continued)

FOREIGN PATENT DOCUMENTS

CN     104005621 A  *  8/2014
CN     210707303 U  *  6/2020

(Continued)

*Primary Examiner* — William L Miller
(74) *Attorney, Agent, or Firm* — HONIGMAN LLP

(57) ABSTRACT

A vehicular exterior door handle assembly includes a bracket, a handle, and a clip. The handle, with the bracket mounted at an exterior door handle region of a vehicular door, is movable relative to the bracket by a user to actuate a latch mechanism for opening the door. The clip is attached at the bracket and engages a pivot end of the handle when the pivot end is inserted into the bracket, and retains the pivot end of the handle at the bracket when the pivot end of the handle is engaged with a pivot element of the bracket. The clip (i) limits movement of the handle relative to the bracket in a direction along a longitudinal axis of the bracket or handle, (ii) allows pivotal movement of the handle about the pivot element of the bracket, and (iii) allows for removal of the handle from the bracket.

28 Claims, 18 Drawing Sheets

(56) References Cited

U.S. PATENT DOCUMENTS

| | | | |
|---|---|---|---|
| 2010/0088855 A1 | 4/2010 | Ruse et al. | |
| 2016/0319573 A1* | 11/2016 | Da Deppo | E05B 79/06 |
| 2019/0048628 A1* | 2/2019 | Pudney | E05B 85/16 |
| 2019/0106051 A1 | 4/2019 | Tuizen et al. | |
| 2020/0248488 A1* | 8/2020 | Muta | B60J 5/0429 |

FOREIGN PATENT DOCUMENTS

| | | | | |
|---|---|---|---|---|
| CN | 215595272 U | * | 1/2022 | |
| DE | 102012112520 A1 | * | 6/2014 | E05B 77/44 |
| DE | 102017216920 A1 | * | 3/2019 | E05B 77/04 |
| WO | WO-2020012261 A1 | * | 1/2020 | E05B 79/06 |

* cited by examiner

US 11,959,311 B2

VEHICLE DOOR HANDLE ASSEMBLY WITH RETAINING CLIP

CROSS REFERENCE TO RELATED APPLICATION

The present application claims the filing benefits of U.S. provisional application Ser. No. 62/941,124, filed Nov. 27, 2019, which is hereby incorporated herein by reference in its entirety.

FIELD OF THE INVENTION

The present invention relates to door handles for vehicles and, more particularly, an exterior door handle for opening a side door of a vehicle responsive to a passive entry device or system.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door.

SUMMARY OF THE INVENTION

The present invention provides a door handle assembly configured to mount at a handle region of a vehicle door. The exterior door handle assembly comprises (i) a bracket configured to mount at the exterior door handle region of the vehicular door, with the bracket having a pivot element, and (ii) a handle having a pivot end and a pull end opposite the pivot end. The handle, with the bracket mounted at the exterior door handle region of the vehicular door, is movable relative to the bracket by a user to actuate a latch mechanism for opening the vehicular door. The exterior door handle assembly includes a clip that is attached at the bracket and that engages the pivot end of the handle and retains the pivot end of the handle at the bracket when the pivot end of the handle is engaged with the pivot element of the bracket. The clip is configured to (i) limit movement of the handle relative to the bracket in a direction along a longitudinal axis of the bracket or handle, (ii) allow pivotal movement of the handle about the pivot element of the bracket, and (iii) allow for removal of the handle from the bracket.

The clip thus automatically snap attaches the pivot end of the handle at the bracket without requiring an additional operator process to move the clip or adjust the clip. The clip thus provides an easier way of snapping the pivot end into the bracket and retaining the handle at the bracket so that the handle cannot be pulled out of the bracket or moved longitudinally relative to the bracket (i.e., the handle can only pivot relative to the bracket). When the handle needs to be removed (such as for service or replacement), the clip can be manipulated by an operator (from inside the vehicle door) so the clip releases or disengages from the pivot end of the handle to allow the handle to be removed from the bracket.

These and other objects, advantages, purposes and features of the present invention will become apparent upon review of the following specification in conjunction with the drawings.

DESCRIPTION OF THE PREFERRED EMBODIMENTS

Figure 1:
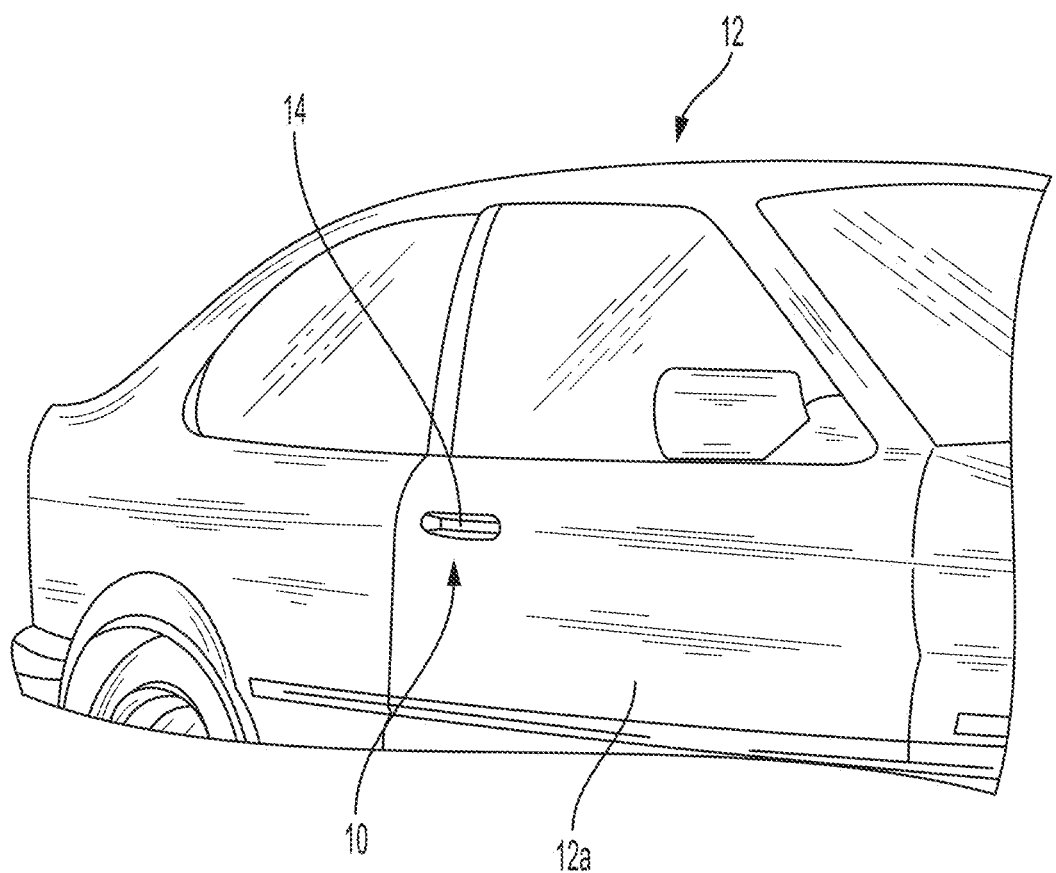
FIG. 1 is a perspective view of a vehicle with a door handle assembly of the present invention.

Referring now to the drawings and the illustrative embodiments depicted therein, a vehicle door handle assembly 10 is mountable to a door 12a of a vehicle 12 and operable to release a latch mechanism (not shown) of the door 12a to open the vehicle door (FIG. 1). Vehicle door handle assembly 10 includes a handle portion 14 that is disposed at the door and that is fixedly mounted at the door or to a bracket mounted to the door. The handle portion may be movably mounted at the handle region of the vehicle door (such as pivotally mounted), whereby movement of the handle portion by a user opens the vehicle door.

Figure 2:
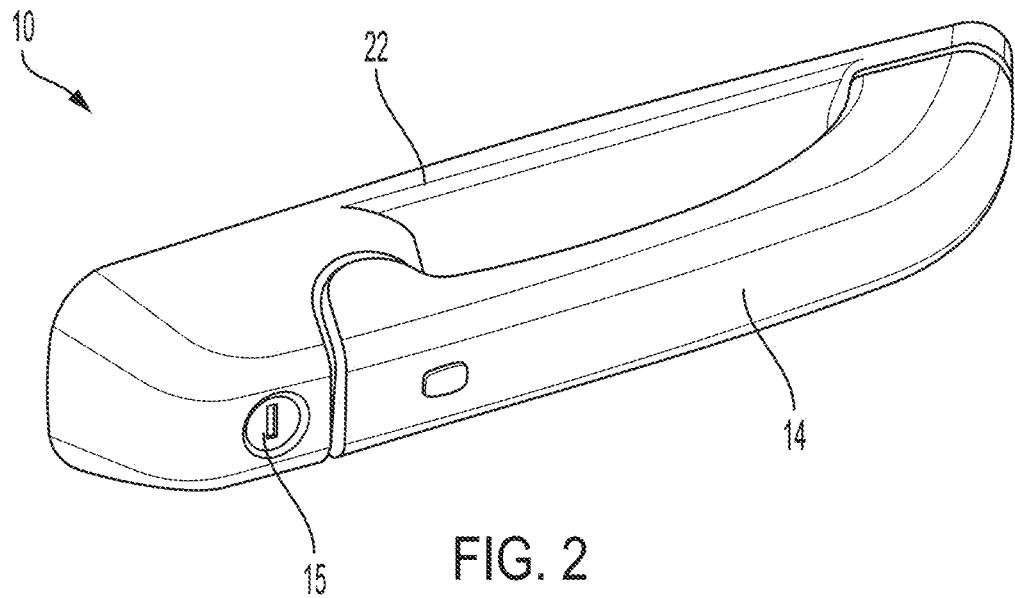
FIG. 2 is a perspective view of the door handle assembly.
Figure 3:
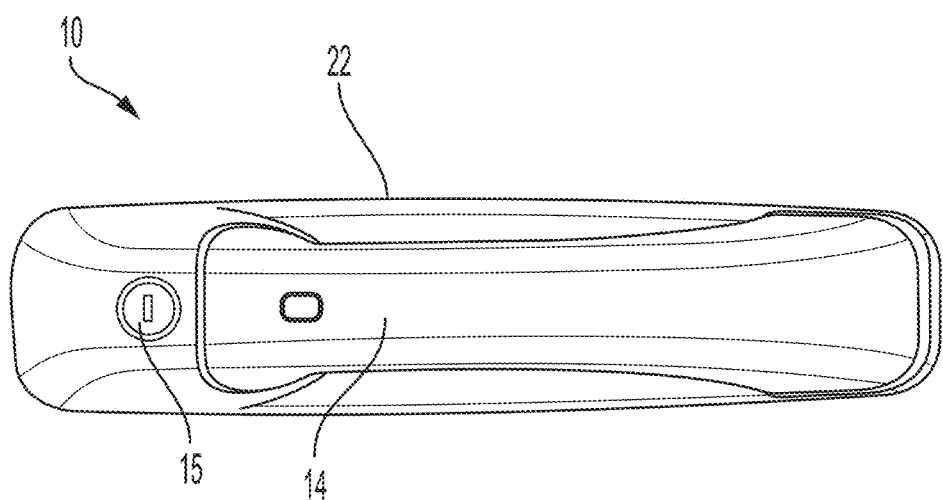
FIG. 3 is a plan view of the door handle assembly.
Figure 4:
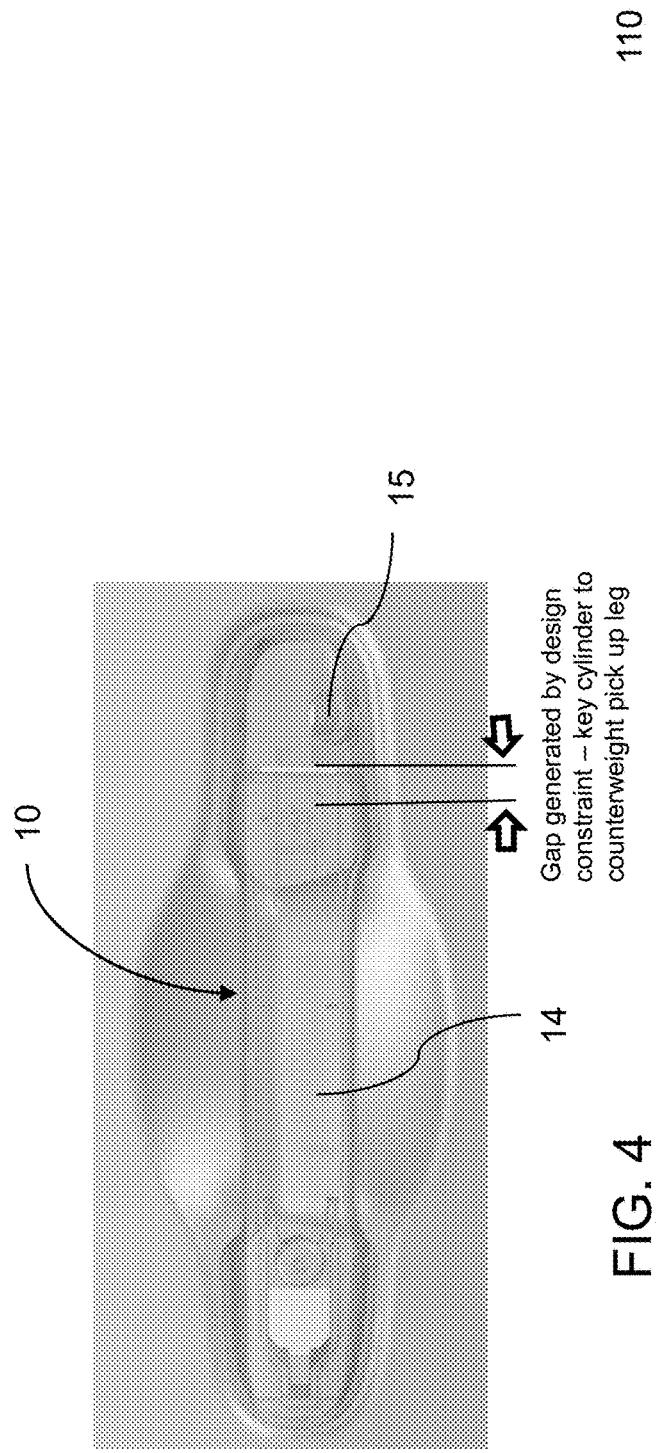
FIG. 4 is another plan view of the door handle assembly with a hidden key cylinder.

In the illustrated handle assembly of FIGS. 2 and 3, the handle has a key cylinder 15 that is accessible at the handle portion 14. It is sometimes desirable to have the key cylinder hidden behind the handle portion, with the key cylinder disposed at the bracket and door. By hiding the key cylinder, the design requires the assembly of the key cylinder to the sheet metal prior to the handle installation. This requires a gap (see FIG. 4) between the handle counterweight pick up leg and key cylinder and eliminates the potential to use the key cylinder or bezel plug as a fore/aft stop feature (to limit movement of the handle portion relative to the bracket in a direction along the handle and door).

Figure 5:
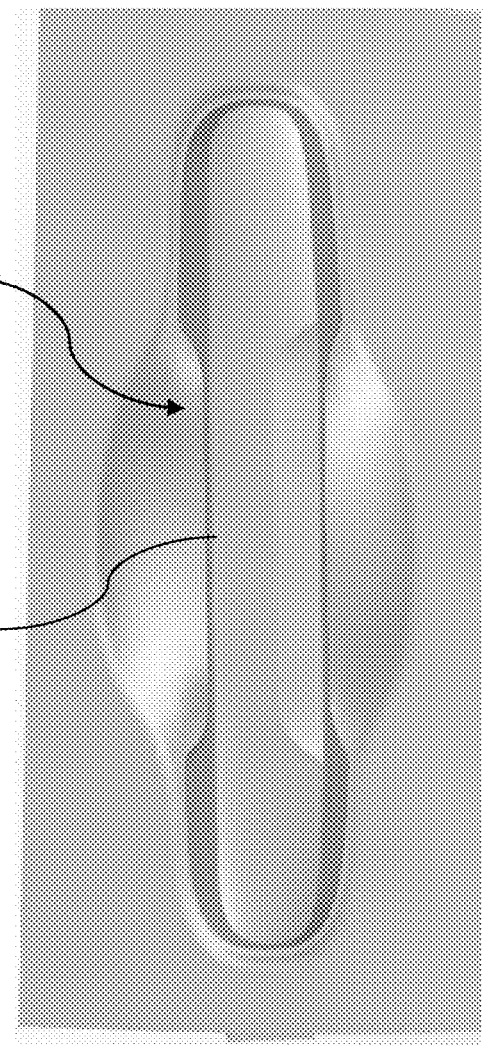
FIG. 5 is a plan view of a door handle assembly with a hidden key cylinder.
Figure 7:
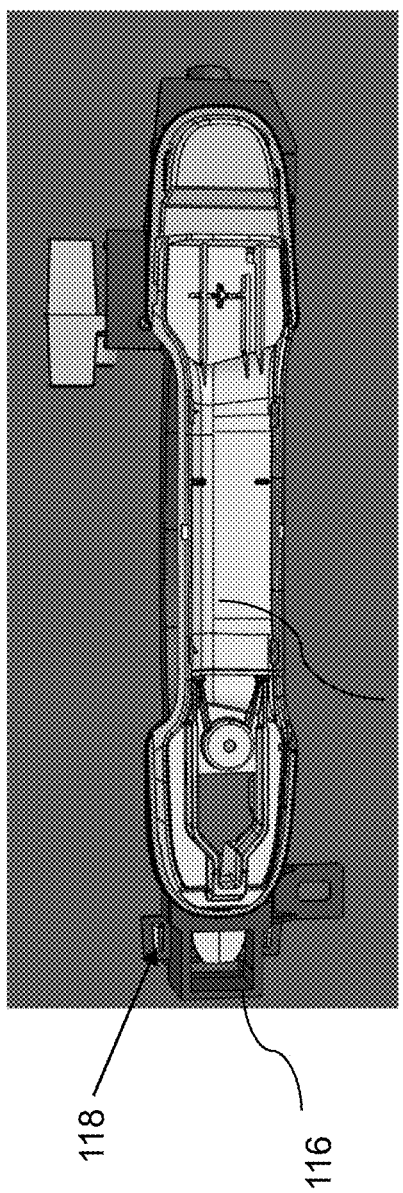
FIG. 7 is a plan view of the door handle and clip of the door handle assembly, as viewed from outside the door.
Figure 6:
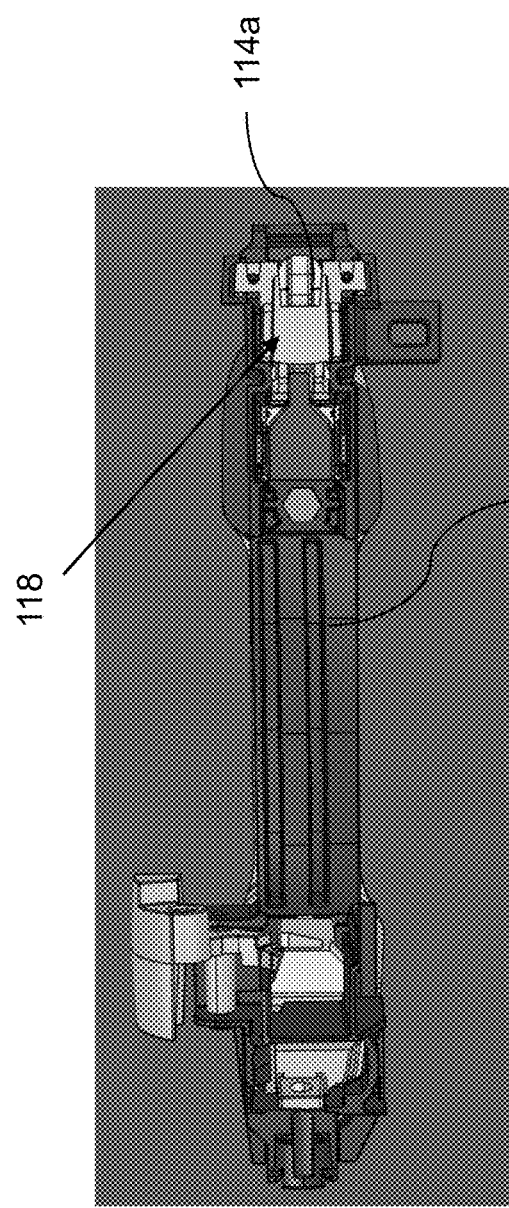
FIG. 6 is a plan view of the bracket and clip of the door handle assembly, as viewed from inside the door.
Figure 9:
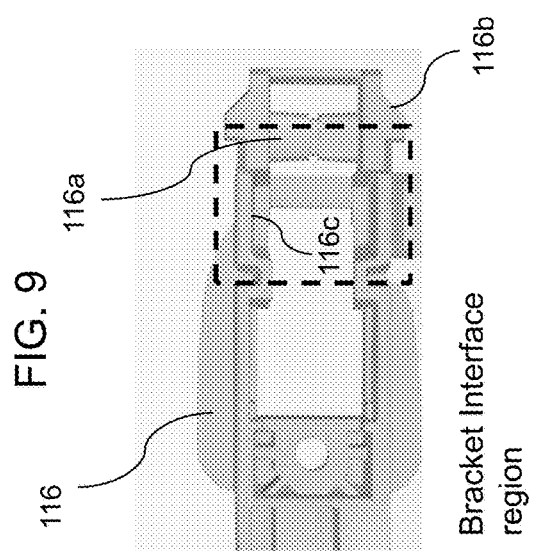
FIG. 9 is a plan view of the pivot end of the bracket.

In the illustrated handle assembly of FIG. 5, the door handle assembly 110 is mountable to the door of the vehicle and is operable to release a latch mechanism (not shown) of the door to open the vehicle door. The vehicle door handle assembly 110 includes a handle portion 114 that is disposed at the door and that is fixedly mounted at the door or to a bracket 116 mounted to the door. The handle portion 114 is pivotally mounted at the bracket at the handle region of the vehicle door, whereby outward pivotal movement of the handle portion by a user opens the vehicle door.

The door handle assembly 110 includes a clip 118 that is disposed at (such as snap-attached to or formed with) the bracket 116 and that functions to retain the pivot end 114a of the handle 114 at a pivot element 116a of the bracket, while allowing for removal of the handle 114 from the bracket, such as may be required for service or replacement of the handle. The claim is shipped with the bracket or bracket assembly 116 and retains the handle to the bracket/vehicle (at the vehicle assembly plant) and maintains anti-wobble targets and achieves strength targets in excess of 1000 Newtons.

As can be seen with reference to FIGS. 8A-18, the clip 118 includes a pair of attaching tabs 118a and a pair of retaining legs or tabs 118b, which can be flexed outwardly away from one another by squeezing a pair of releasing tabs or grip portions 118c. In the illustrated embodiment, the legs 118b extend from a base portion or joining portion 118d of the clip and the tabs 118c extend from the base portion 118d in a direction opposite from the legs 118b, such that movement of the tabs 118c toward one another causes an opposite movement of the legs 118b away from one another. The attaching tabs 118a are configured to snap attach the clip at a pair of tabs 116b of the bracket 116.

Figure 13A:
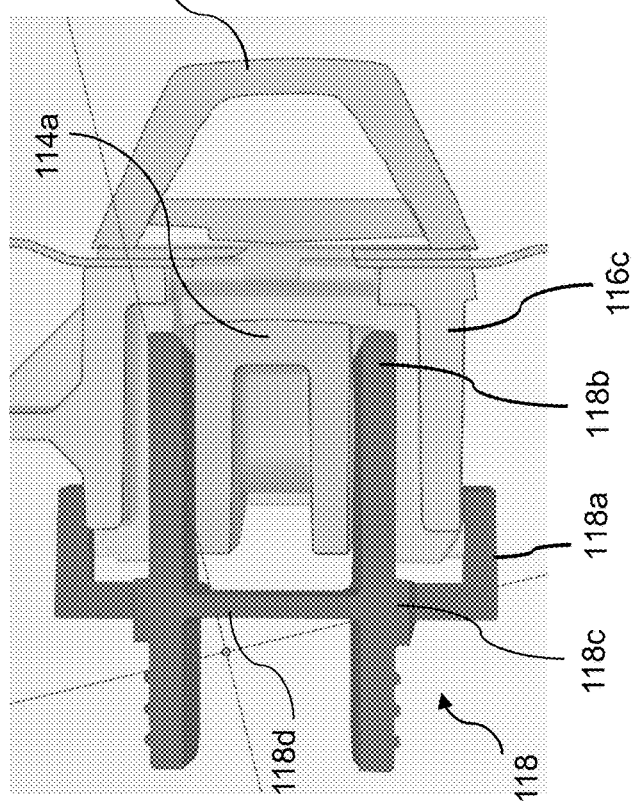
FIGS. 13A and 14A are cross-sectional views of the clip, bracket, and handle of FIGS. 11 and 12.
Figure 13B:
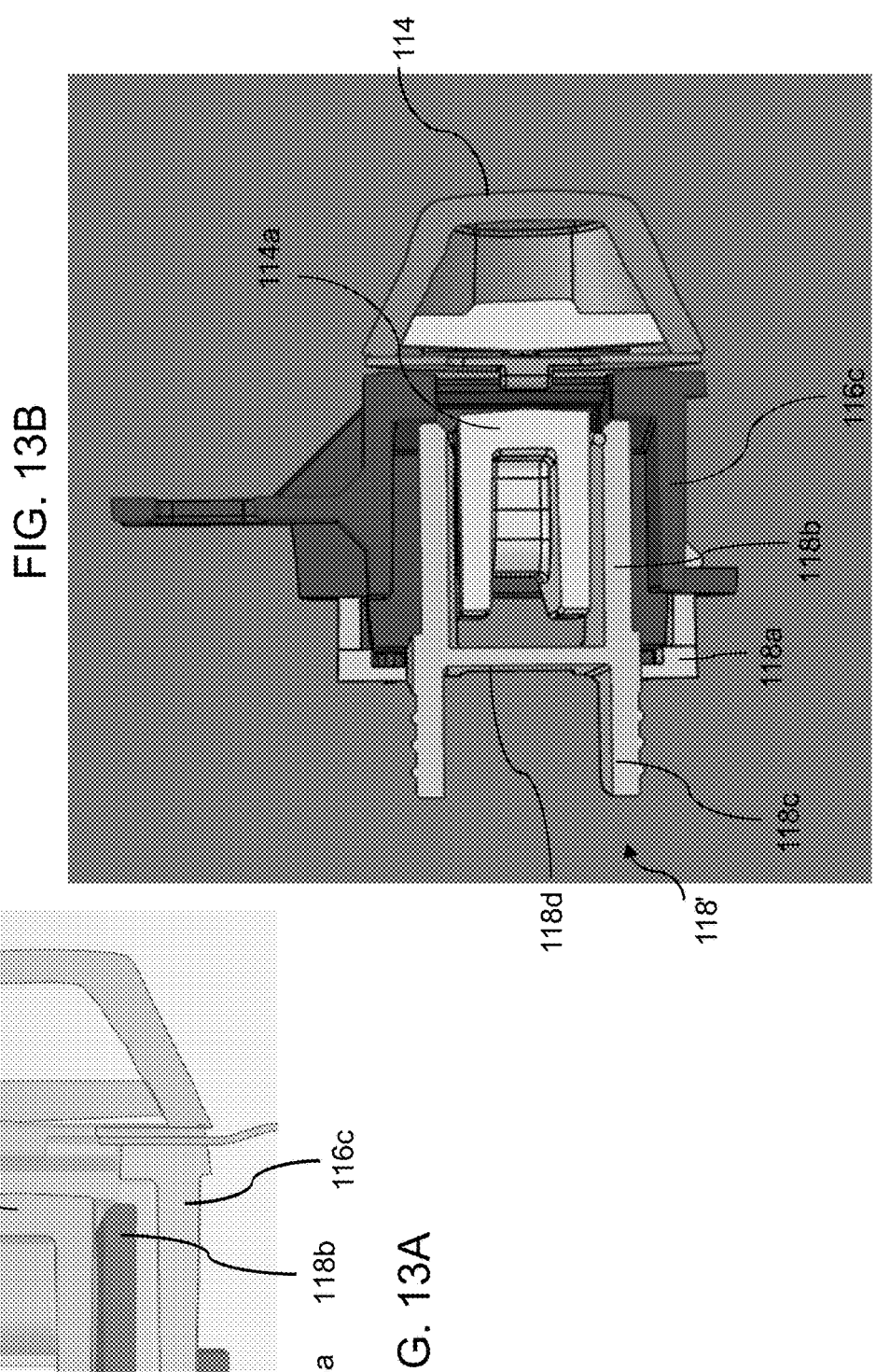
FIGS. 13B and 14B are cross-sectional views of the clip of FIG. 8B retaining the pivot end of the handle at the bracket.
Figure 14B:
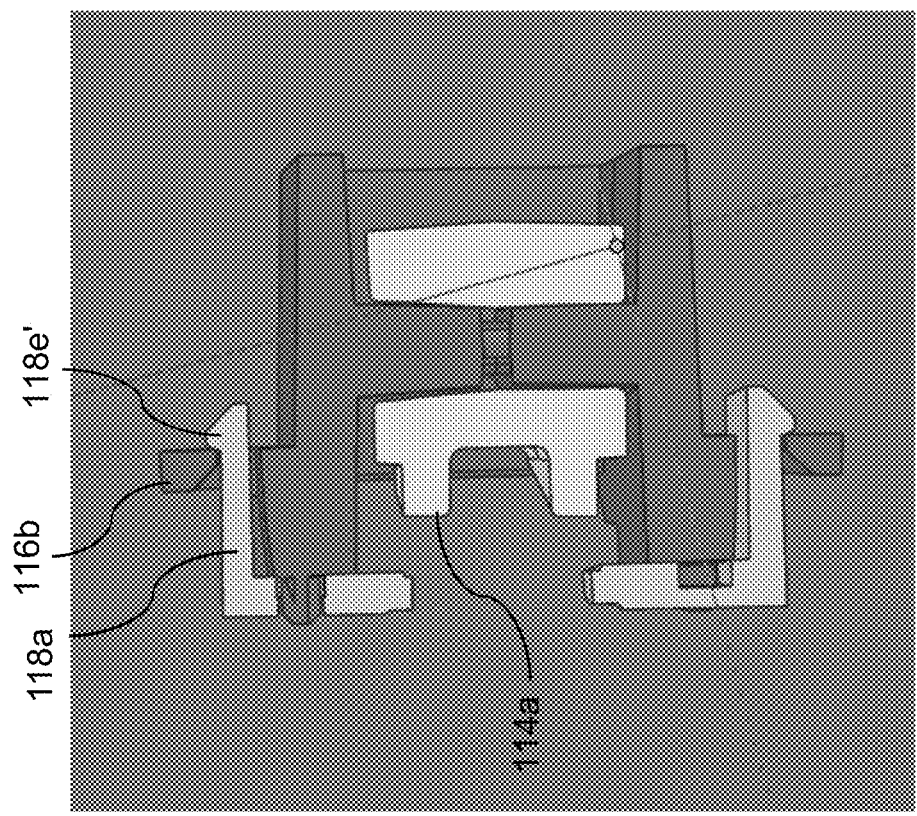
Figure 14A:
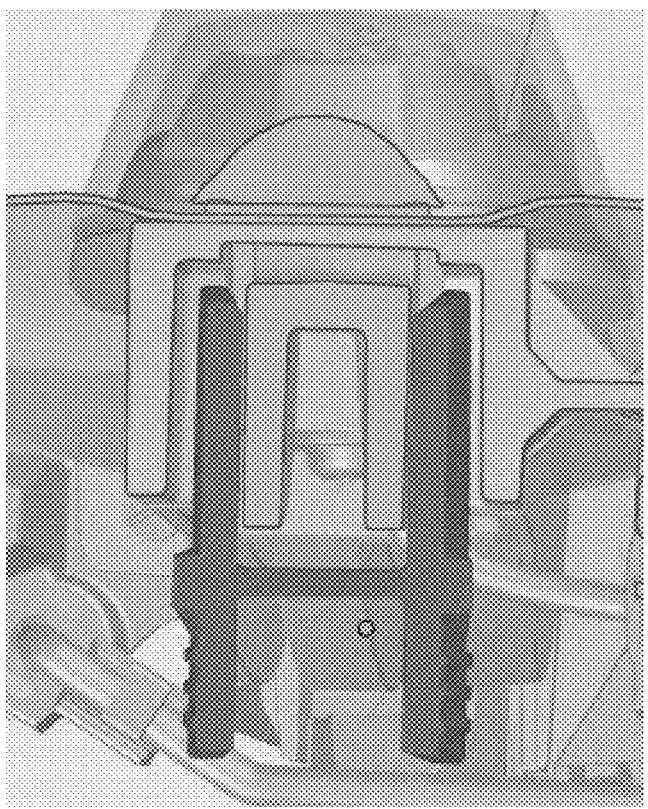
Figure 16:
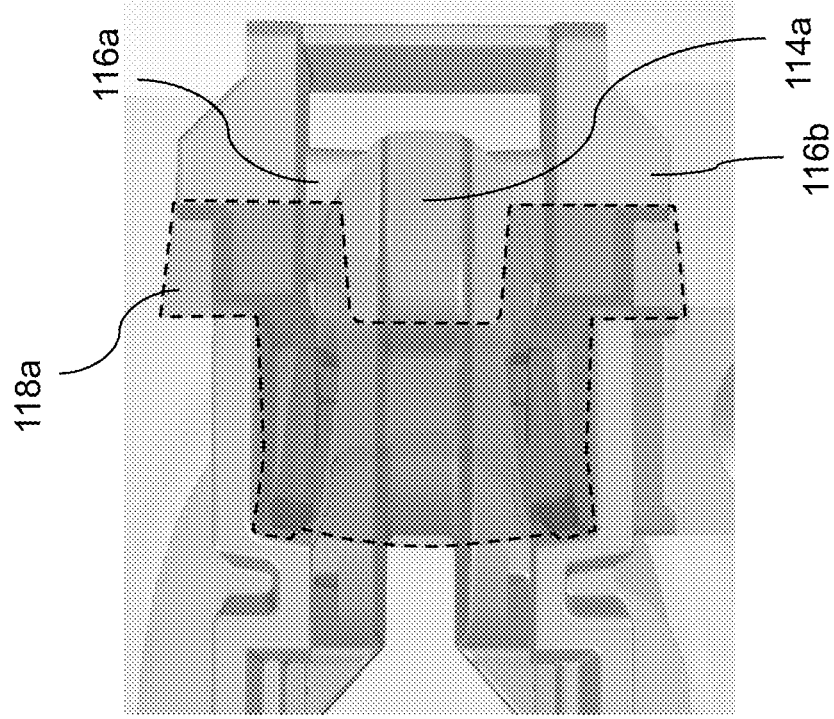
FIG. 16 is the same view as FIG. 15, with the clip.
Figure 15:
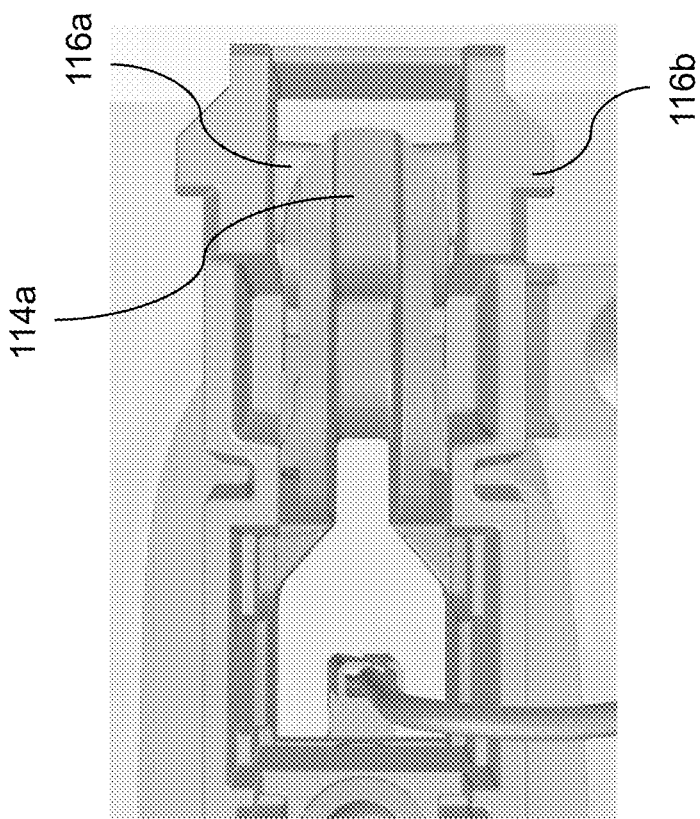
FIG. 15 is a view showing the pivot end of the handle at the bracket, without the clip.
Figure 17:
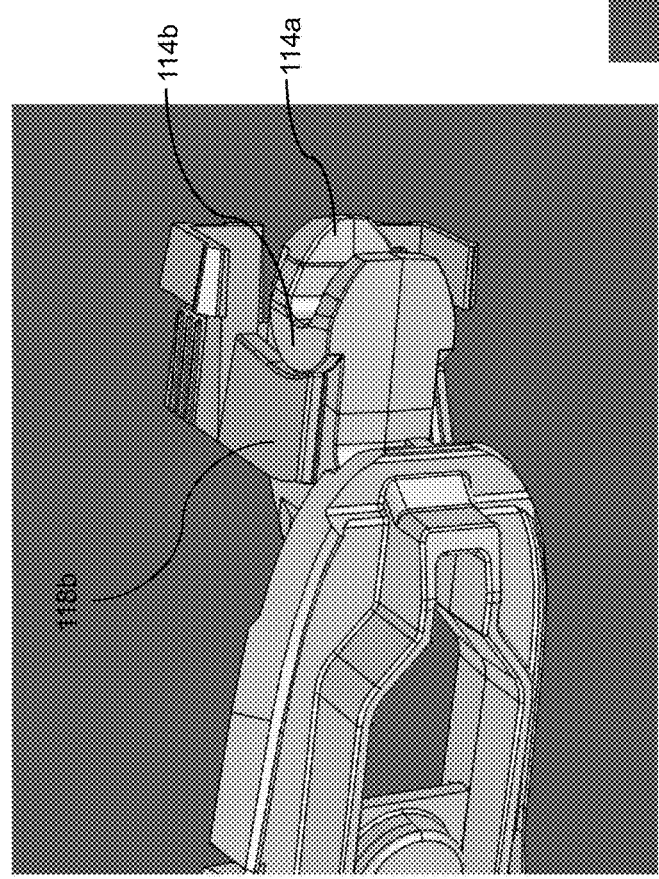
FIG. 17 is a perspective view of the pivot end of the handle with the clip.
Figure 18:
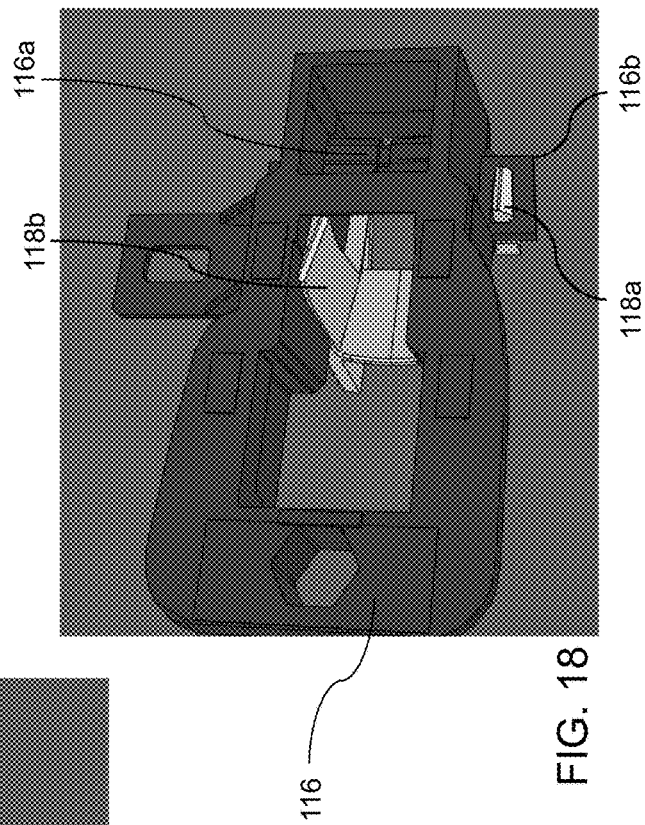
FIG. 18 is a perspective view of the end of the bracket with the clip.
Figure 19:
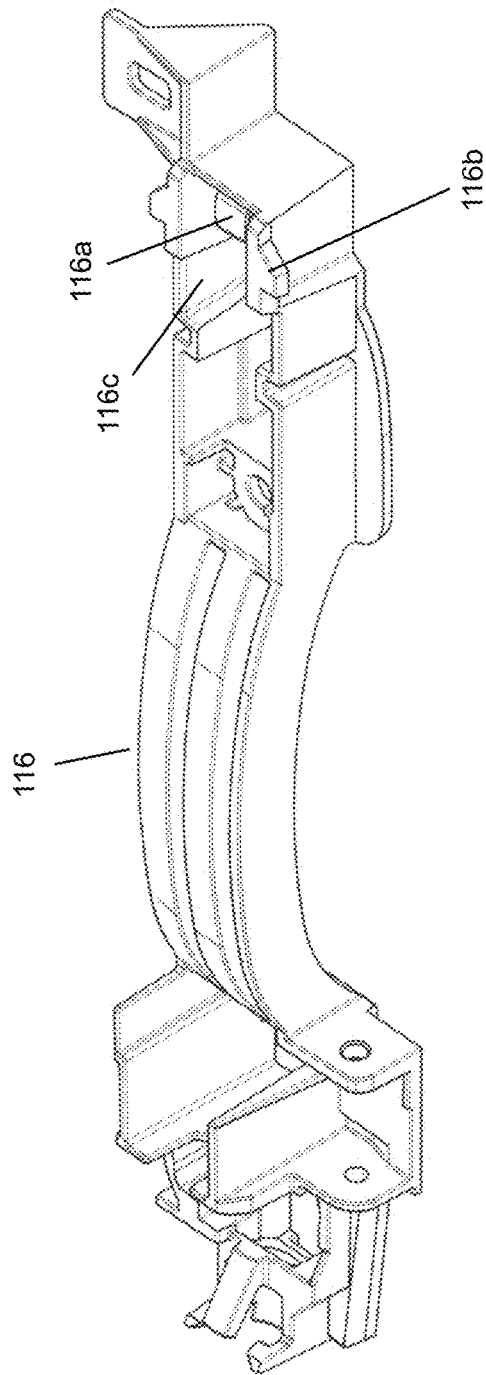
FIGS. 19 and 20 are perspective views of the bracket.
Figure 20:
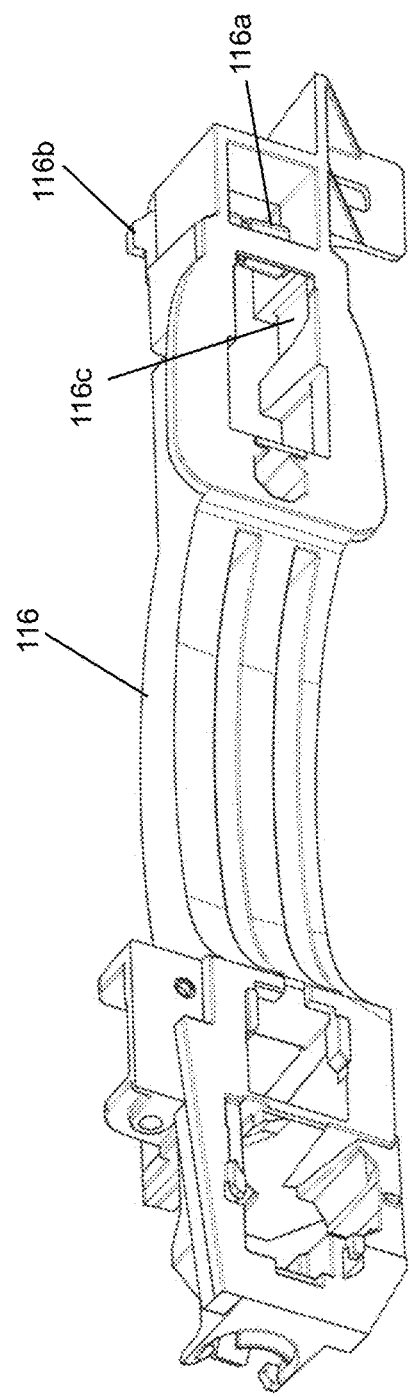
Figure 22:
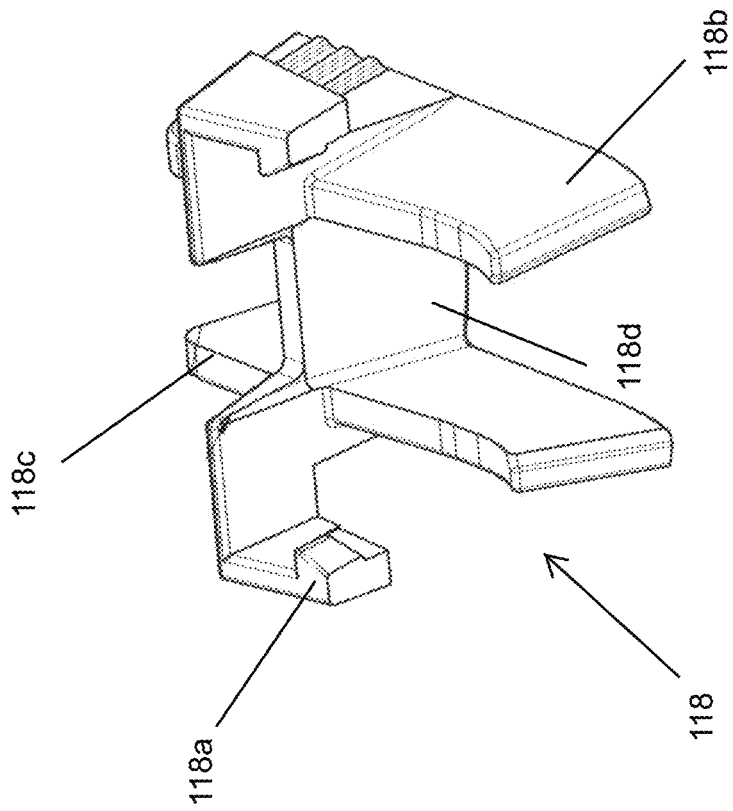
FIGS. 21 and 22 are perspective views of the clip.
Figure 21:
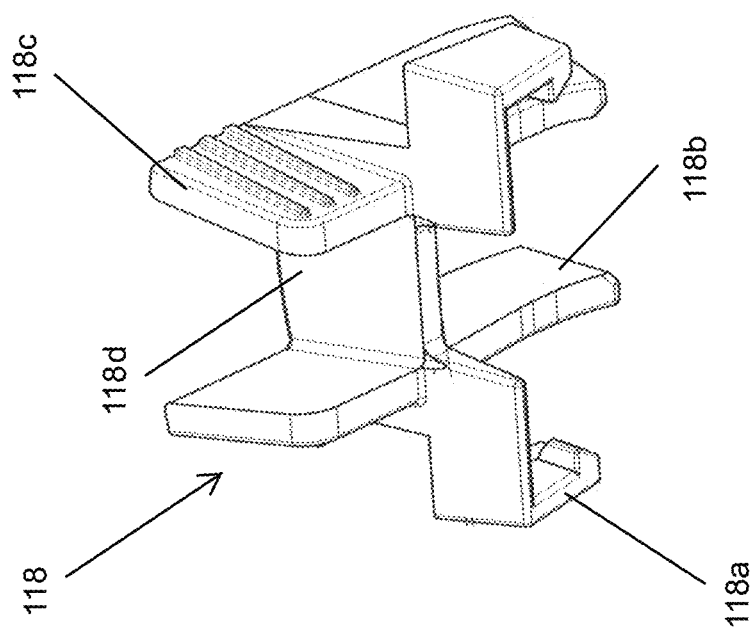
Figure 24:
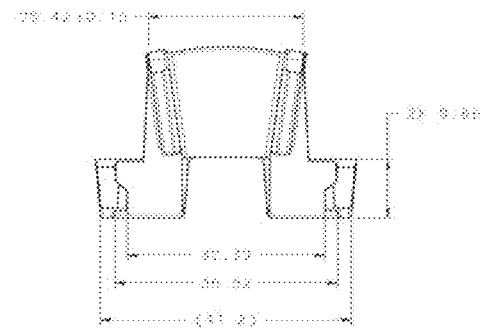
FIGS. 23-25 are additional views of the clip, showing exemplary dimensions and tolerances for the clip.
Figure 25:
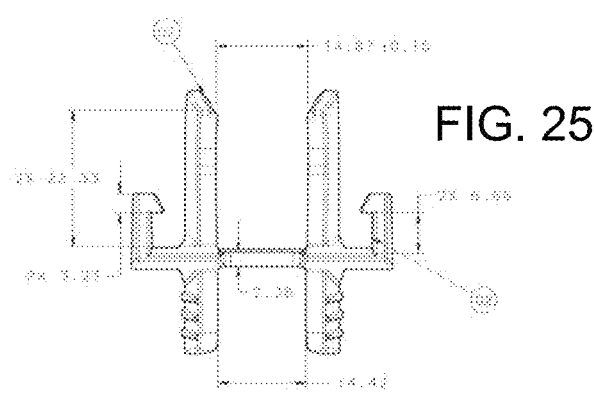
Figure 23:
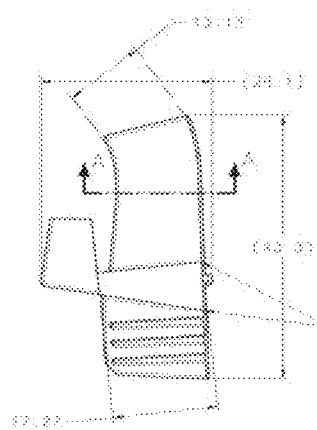
Figure 23A:
Figure 27:
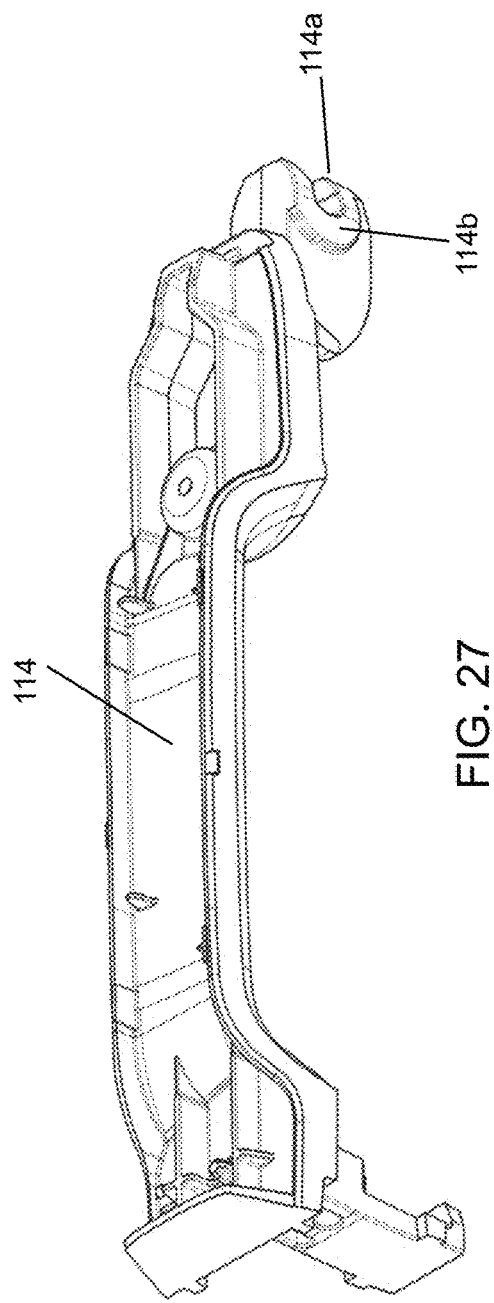
FIGS. 26 and 27 are perspective views of the handle.
Figure 26:
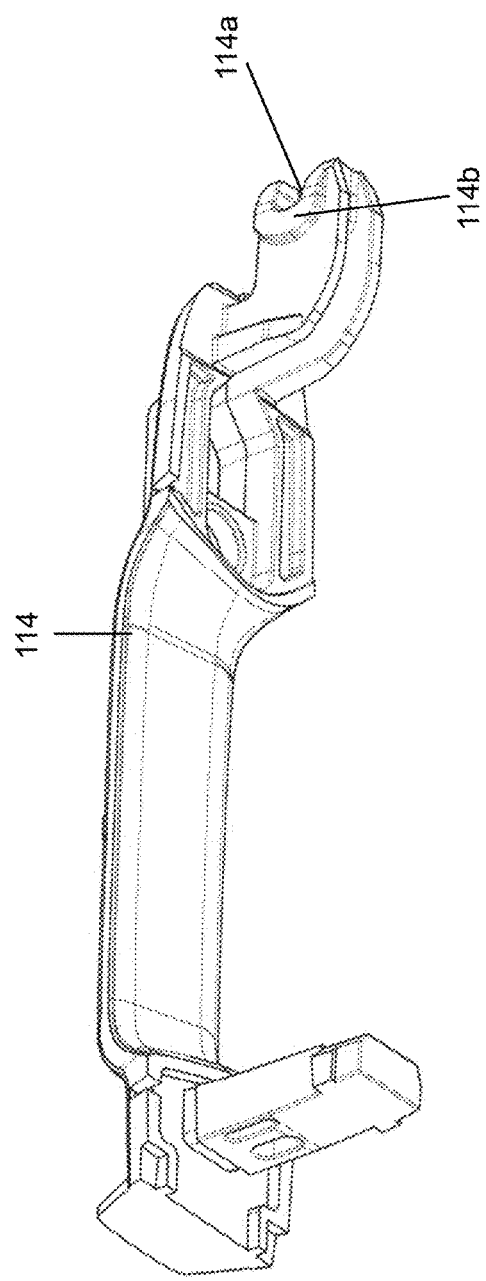
Figure 28:
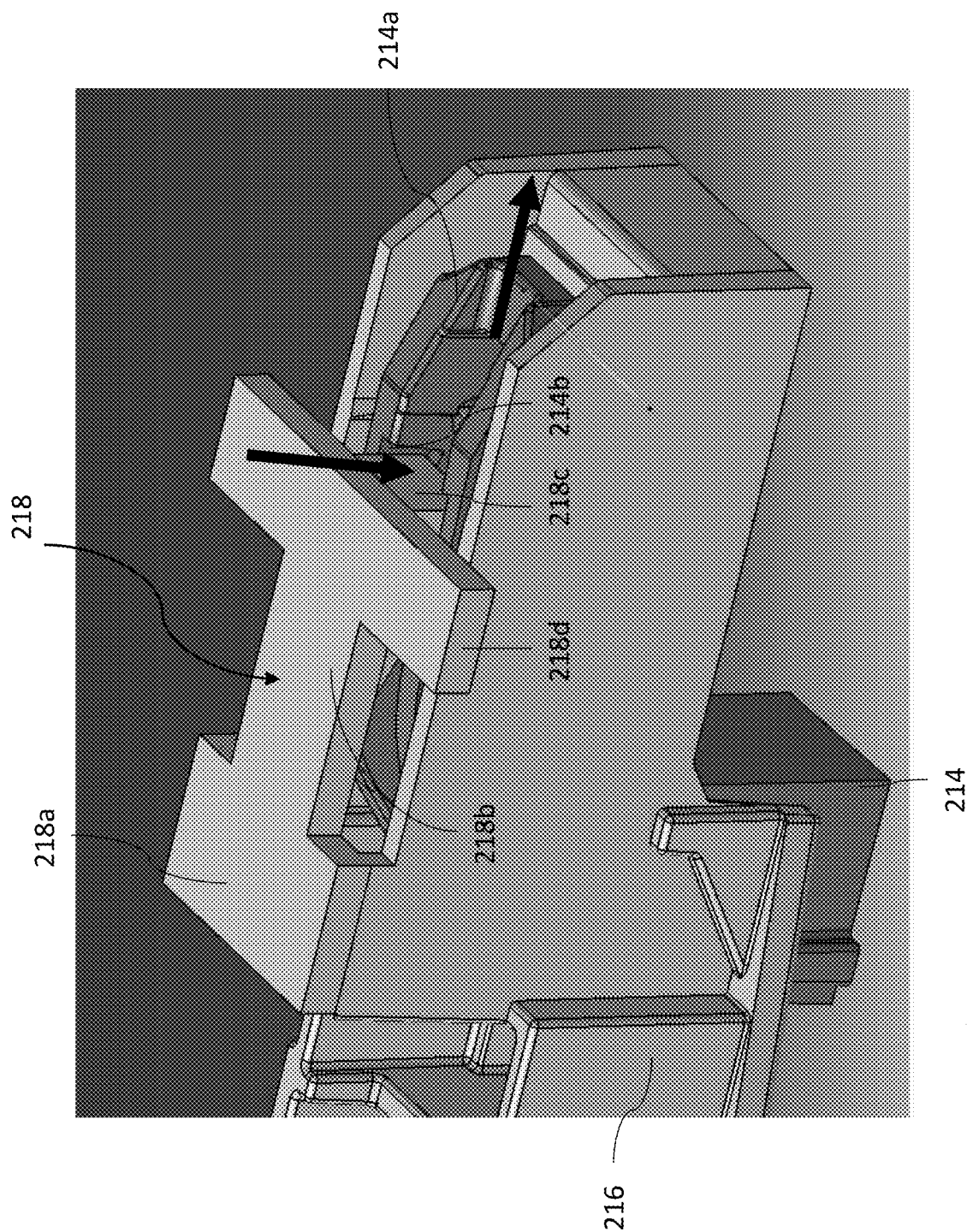
FIG. 28 is a perspective view of another clip at a bracket and handle.
Figure 29:
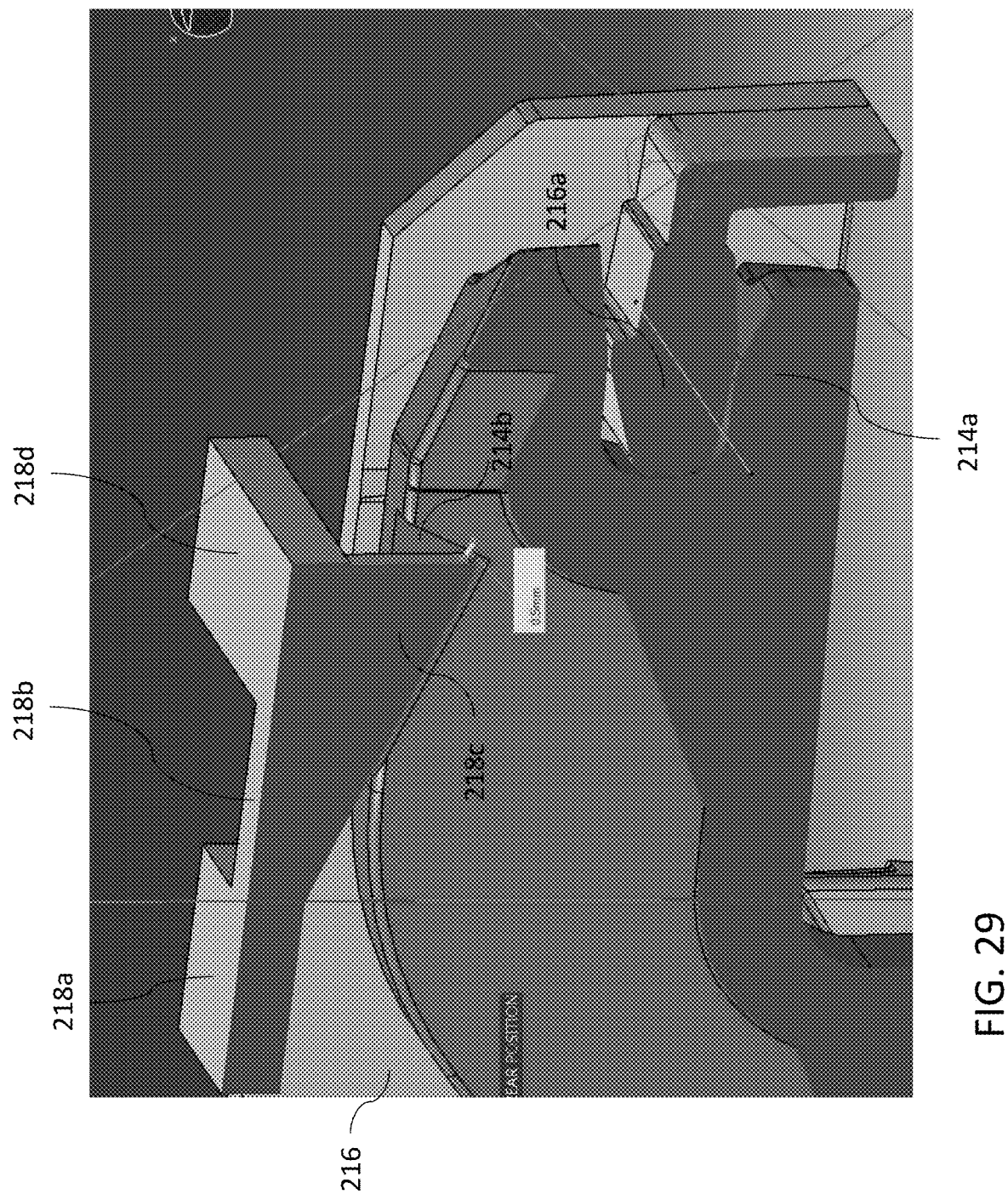
FIGS. 29 and 30 are perspective partial sectional views of the clip, bracket and handle of FIG. 28.
Figure 30:
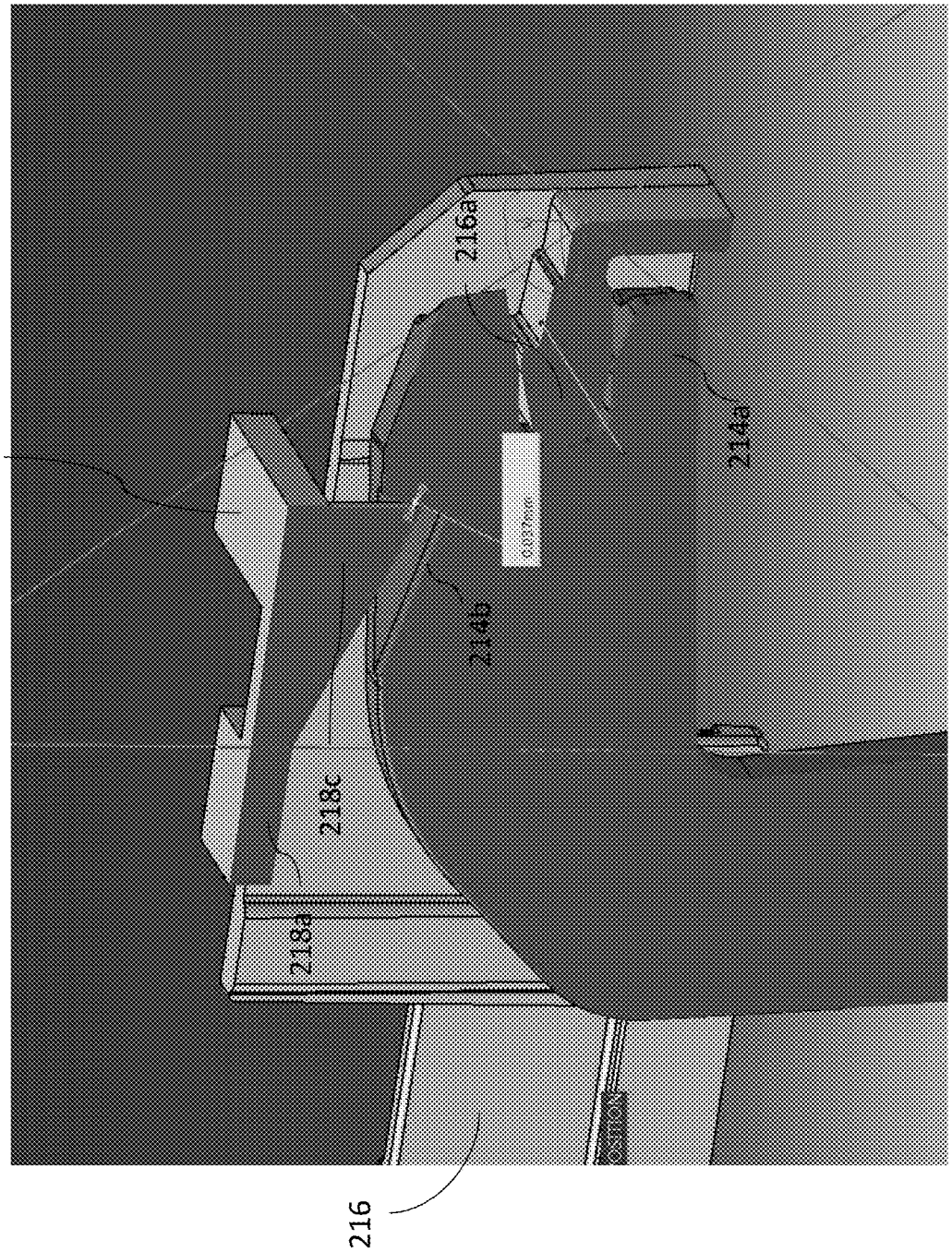
Figure 31:
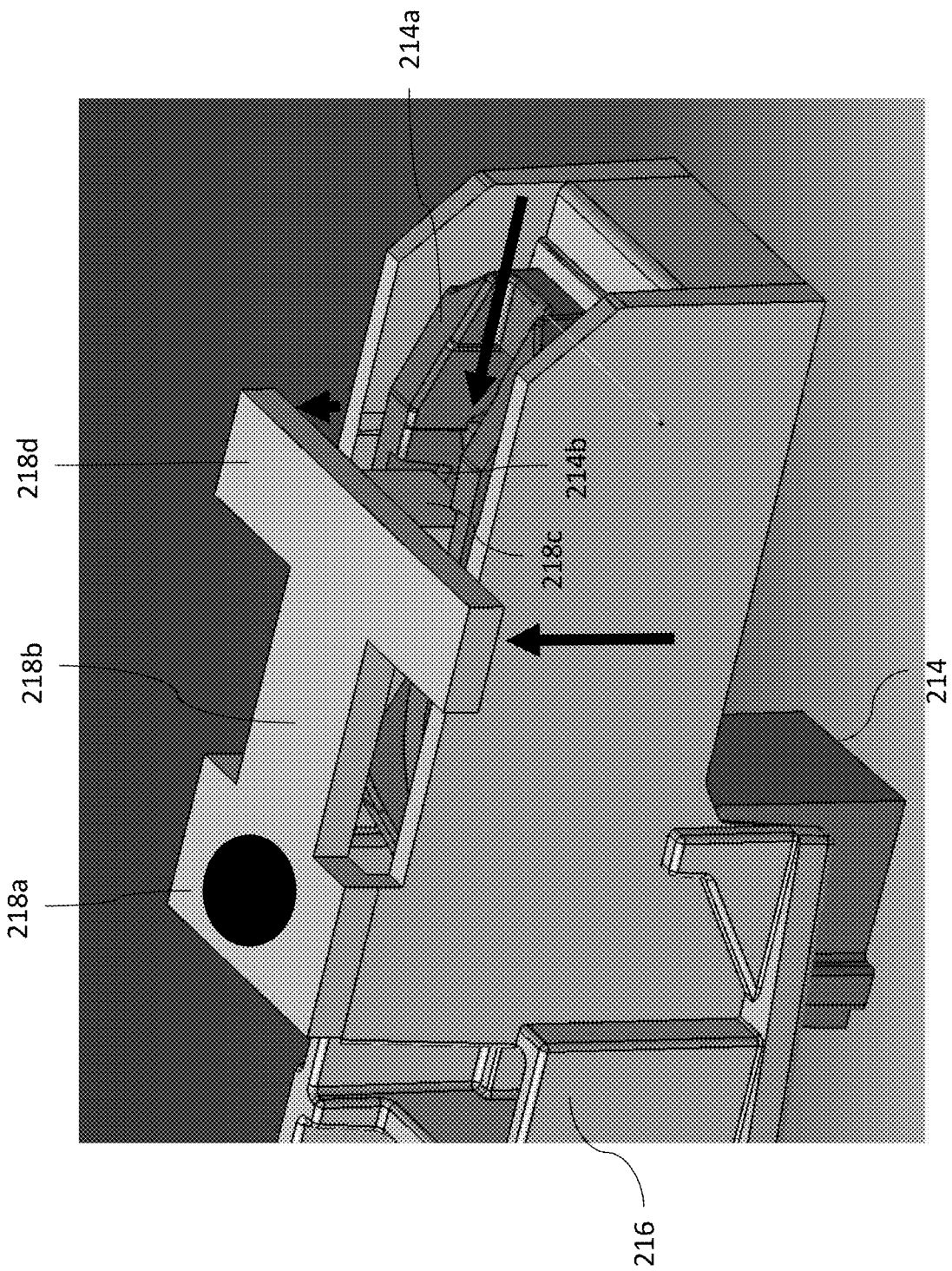
FIG. 31 is another perspective view of the clip, bracket and handle of FIG. 28.

The snap attachment is via protruding feet 118e of the tabs 118a engaging a surface of the tabs 116b of the bracket. As shown in the embodiment of the clip 118 of FIG. 8A, the attaching tabs 118a may have inward-facing feet 118e for retaining the clip at the tabs 116b of the bracket 116 (as shown in FIGS. 13A and 14A). Optionally, another clip 118' (shown in FIGS. 8B, 13B, and 14B) may have outward-facing feet 118e' for engaging the tabs 116b of the bracket. Other than the feet 118e facing inward in the clip 118 of FIG. 8A and the feet 118e' facing outward in the clip 118' of FIG. 8B, the two embodiments of the clip 118, 118' have similar features and interact with the bracket 116 and handle 114 in a fashion consistent with the rest of this disclosure, such that a detailed discussion of the clips need not be repeated herein.

When the clip 118 is attached at the bracket 116, the retaining legs 118b of the clip are received in and along respective channels 116c of the bracket and are biased toward one another. When the legs 118b are received in the channels 116c, they flex outwardly (with the channels providing clearance for the outward movement) as the pivot end 114a of the handle 114 is inserted into the bracket so that the pivot end receives the pivot element 116a of the bracket 116. When the pivot end is fully inserted or seated in the bracket, the legs 118b snap inward and engage the handle interface surface 114b (FIG. 10).

Figure 10:
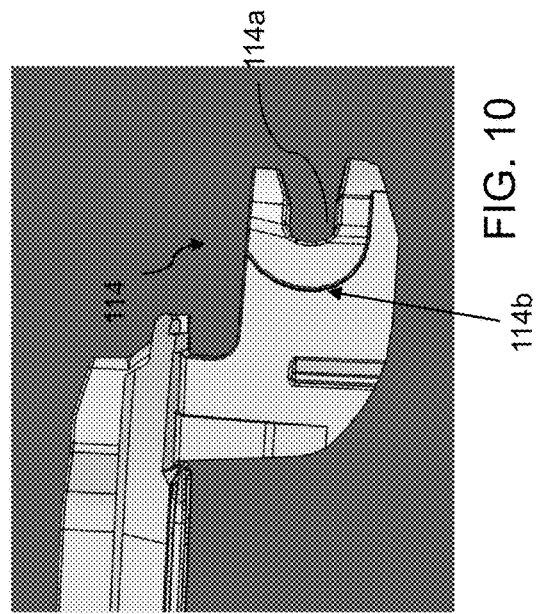
FIG. 10 is a side view of the pivot end of the handle.
Figure 8A:
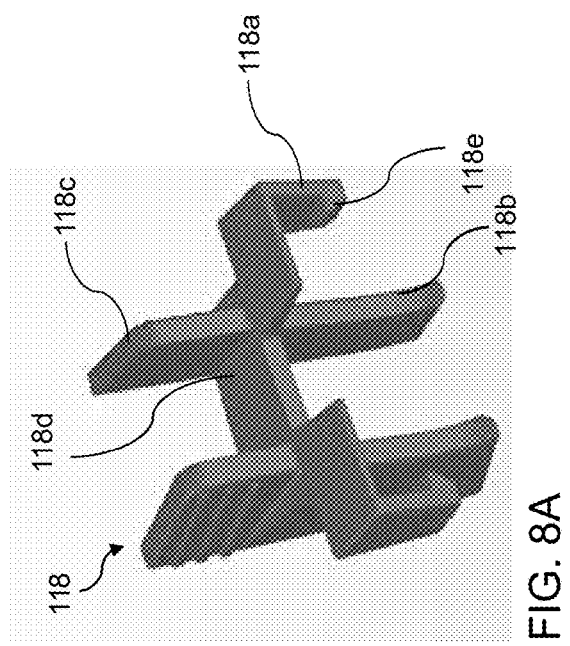
FIG. 8A is a perspective view of the clip.
Figure 8B:
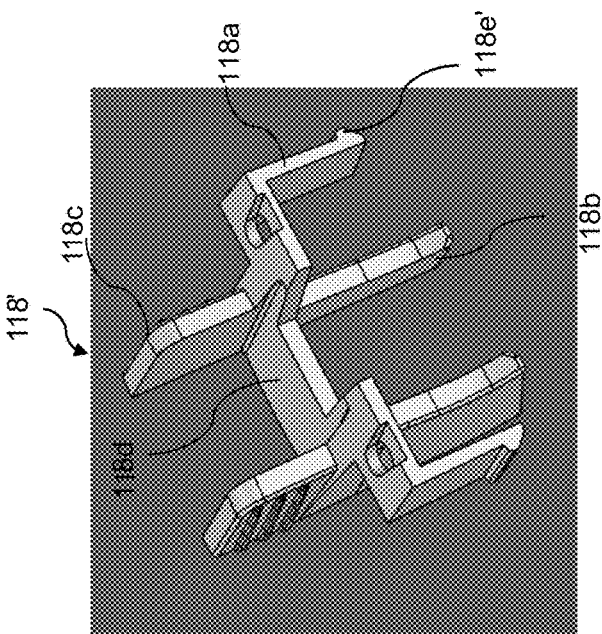
FIG. 8B is a perspective view of another clip.
Figure 11:
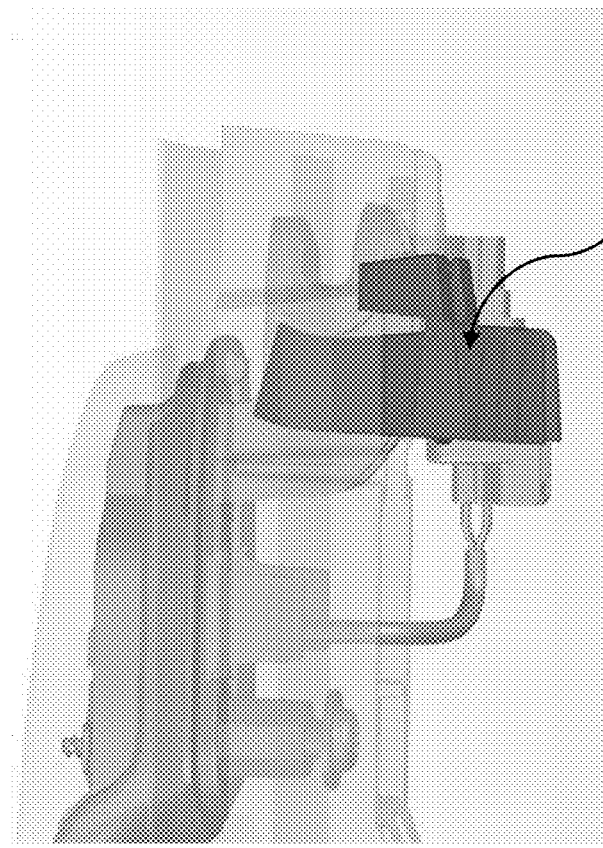

As can be seen with reference to FIGS. 10 and 11, the interface surface 114b of the handle 114 comprises a raised curved surface at each side of the pivot end 114a of the handle 114, with a radius of curvature of the raised curved surface having its center at the pivot center of the pivot element 116a of the bracket (i.e., the raised curved surface 114b is curved about the pivot axis of the handle). The legs 118b of the clip 118 are also curved so that, when the handle is attached at the bracket and clip, the legs of the clip engage the raised curved surface of the pivot end of the handle and allow for pivotal movement of the handle while limiting movement of the handle in a direction along the longitudinal axis of the handle and bracket. Thus, the clip provides a load bearing feature that interfaces with the handle and prevents fore/aft movement of the handle, while allowing for handle removal. Although shown and described as being a raised surface or protrusion, the pivot end of the handle may comprise curved recesses that receive curved protrusions at the retaining legs of the clip when the handle is inserted into the bracket and clip.

Figure 12:
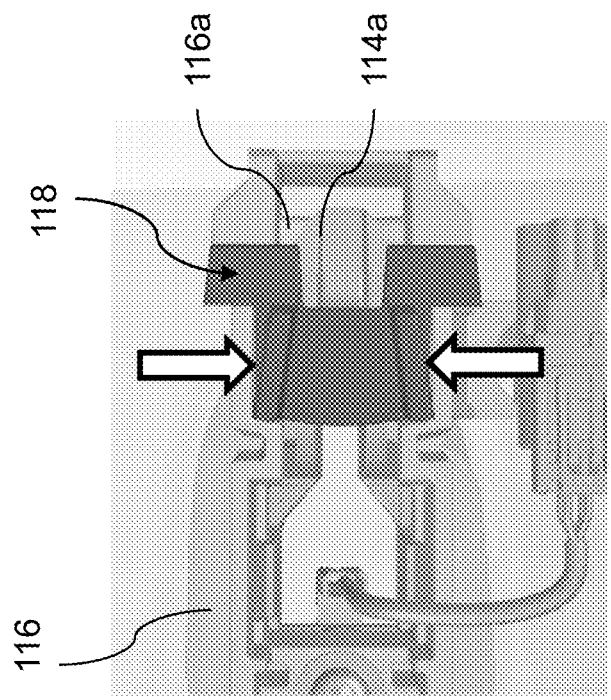
FIGS. 11 and 12 are views of the clip retaining the pivot end of the handle at the bracket.

The legs 118b extend from a base portion or joining portion 118d of the clip and the tabs 118c extend from the base portion 118d in a direction opposite from the legs 118b, such that movement of the tabs 118c toward one another causes an opposite movement of the legs 118b away from one another. As shown in FIG. 12, to remove the handle, the tabs 118c are squeezed together (see arrows in FIG. 12), which causes opposite flexing or separating of the legs 118b (into the channels 116c) to provide clearance between the legs and the raised curved surface 114b of the pivot end 114a of the handle, whereby the handle can be pulled outwardly from the clip and bracket.

Thus, the bracket 116 and clip 118 can be assembled at the handle manufacturer facility and shipped to the vehicle assembly plant as a unit, with the handle 114 shipped separately. At the vehicle assembly plant, the bracket can be attached to the door and the lock cylinder can be attached to the bracket. The handle is then snapped into the clip at the bracket and pivoted into place along the bracket (with the appropriate electrical and mechanical connections being made to the door wires and latch mechanism linkage. The clip retains the handle in position relative to the bracket while allowing for pivotal movement of the handle, and allows for removal of the handle from the bracket and door for service or replacement of the handle. To remove the handle for service, a user (from inside the vehicle door) may grasp the tabs 118c and squeeze them together to flex the legs 118b of the clip to disengage the legs 118b from the raised curved surface 114b of the handle. When the legs are disengaged from the raised surface, the handle can be pulled in the longitudinal direction away from the pivot element or axle and then removed from the bracket.

Optionally, the clip may engage a notch or tab at another region or surface of the pivot end of the handle, such as an inboard surface of the handle, where the clip and handle are formed so as to allow for pivotal movement of the handle yet to limit movement of the handle along the longitudinal axis of the handle and bracket. Optionally, the clip feature may be integrally formed with the bracket.

For example, and with reference to FIGS. 28-31, a bracket 216 has a pivot element or axle 216a and a clip 218 formed as part of the bracket. The clip 218 comprises a base part 218a that is attached at or formed with the bracket 216, and a flexible part 218b that flexes relative to the base part 218. The flexible part 218b has a tab or tooth 218c that extends into the bracket cavity for engaging a notch 214c of the handle 214 when the pivot end 214a of the handle is inserted into the bracket to pivotally engage the pivot element 216a. As can be seen with reference to FIGS. 29 and 30, the pivot end of the handle can pivot about the pivot element while the tab 218c of the clip 218 remains at least partially in the notch 214c to allow for pivotal movement of the handle between the rest position (FIG. 29) and the full pull position (FIG. 30), while limiting retraction of the handle from the pivot element.

The handle can be attached to the bracket by inserting the pivot end of the handle into the bracket until the tab 218c snaps into the notch. To remove the handle for service, a user (from inside the vehicle door) may place their thumb on the dot (see FIG. 31) and pull at the tabs or wings 218d to flex the flexible part 218b of the clip to disengage the tab 218c from the notch 214c. When the tab is disengaged from the notch, the handle can be pulled in the longitudinal direction away from the pivot element or axle and then removed from the bracket.

The door handle assembly may utilize aspects of the assemblies described in U.S. Publication No. US-2019-0106051, which is hereby incorporated herein by reference in its entirety. The door handle assembly may comprise any suitable type of door handle assembly, and may include or incorporate aspects of the door handle assemblies and lighting devices described in U.S. Pat. Nos. 6,349,450; 6,550,103; 6,907,643; 7,407,203; 8,333,492; 8,786,401 and/or 8,801,245, and/or U.S. Publication Nos. US-2010-0088855 and/or US-2010-0007463, which are hereby incorporated herein by reference in their entireties.

The door handle assembly is operable to open the vehicle door when a user grasps the door handle portion at the side of the vehicle door. The door handle assembly may also be operable in conjunction with a passive keyless entry or other sensing system that is operable to determine whether or not the person at the vehicle door is authorized for entry into the vehicle, and may only open the vehicle door when that system recognizes the user or key fob or transmitting device associated with the owner or authorized user of the vehicle. Optionally, the door handle assembly may be associated with or in communication with a door zone module, such as by utilizing aspects of the vehicle door systems described in U.S. Publication No. US-2010-0007463, which is hereby incorporated herein by reference in its entirety.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:

a bracket configured to mount at an exterior door handle region of a vehicular door, the bracket having a pivot element;

a handle, the handle having a pivot end and a pull end opposite the pivot end;

wherein the handle, with the bracket mounted at the exterior door handle region of the vehicular door, is movable relative to the bracket by a user to actuate a latch mechanism for opening the vehicular door;

a clip disposed at the bracket, the clip engaging the pivot end of the handle responsive to insertion of the pivot end of the handle into the bracket and into engagement with a retaining portion of the clip, the retaining portion of the clip retaining the pivot end of the handle at the bracket when the pivot end of the handle is engaged with the pivot element of the bracket; and wherein the clip is configured to (i) limit movement of the handle relative to the bracket via the retaining portion in a direction along a longitudinal axis of the bracket or handle, (ii) allow pivotal movement of the handle about the pivot element of the bracket, and (iii) allow for removal of the handle from the bracket when the retaining portion is disengaged from the pivot end of the handle.

2. The vehicular exterior door handle assembly of claim 1, wherein the retaining portion of the clip snap attaches at the pivot end of the handle responsive to insertion of the pivot end of the handle into the bracket and clip.

3. The vehicular exterior door handle assembly of claim 1, wherein the retaining portion of the clip comprises a pair of retaining legs that are received in the bracket and that engage opposite sides of the pivot end of the handle when the pivot end of the handle is inserted into the bracket.

4. The vehicular exterior door handle assembly of claim 3, wherein the retaining legs are biased toward one another so as to retain the pivot end of the handle via engagement with a retaining element at each side of the pivot end of the handle.

5. The vehicular exterior door handle assembly of claim 4, wherein the retaining legs flex away from one another as the pivot end of the handle is inserted into the bracket and clip and move toward one another to engage the retaining elements as the pivot end of the handle is further inserted into the bracket.

6. The vehicular exterior door handle assembly of claim 5, wherein the clip comprises a center portion from which the retaining legs extend, and wherein a pair of grasping tabs extend from the center portion in a direction opposite from the retaining legs, and wherein a user can move the retaining legs away from one another to disengage the retaining legs from the retaining elements of the pivot end of the handle by moving the grasping tabs toward one another.

7. The vehicular exterior door handle assembly of claim 6, wherein the bracket has a pair of channels for receiving the retaining legs when the retaining legs are moved away from one another to provide clearance between the separated retaining legs and the retaining elements at the pivot end of the handle.

8. The vehicular exterior door handle assembly of claim 4, wherein the retaining elements comprise protrusions that protrude from opposite sides of the pivot end of the handle.

9. The vehicular exterior door handle assembly of claim 8, wherein an engaging surface of each of the retaining legs is curved and an engaging surface of each of the protrusions is correspondingly curved, and wherein, with the retaining legs engaged with the protrusions, the curved engaging surfaces of the retaining legs engage the correspondingly curved engaging surfaces of the protrusions to allow for pivotal movement of the handle while limiting movement of the handle in the direction along the longitudinal axis of the bracket or handle.

10. The vehicular exterior door handle assembly of claim 1, wherein the clip is snap attached at the bracket.

11. The vehicular exterior door handle assembly of claim 10, wherein the clip further comprises a pair of clip attaching tabs and the bracket further comprises a pair of corresponding bracket attaching tabs, and wherein the clip is snap attached at the bracket via the clip attaching tabs engaging the corresponding bracket attaching tabs.

12. The vehicular exterior door handle assembly of claim 1, wherein a base portion of the clip is formed as part of the bracket, and wherein the retaining portion comprises a flexible portion of the clip that flexes to engage and disengage from the pivot end of the handle.

13. The vehicular exterior door handle assembly of claim 1, wherein the clip has a tab that engages a notch at a surface of the pivot end of the handle when the pivot end of the handle is inserted into the bracket.

14. A vehicular exterior door handle assembly, the vehicular exterior door handle assembly comprising:

a bracket configured to mount at an exterior door handle region of a vehicular door, the bracket having a pivot element;

a handle, the handle having a pivot end and a pull end opposite the pivot end;

wherein the handle, with the bracket mounted at the exterior door handle region of the vehicular door, is movable relative to the bracket by a user to actuate a latch mechanism for opening the vehicular door;

a clip attached at the bracket, the clip engaging the pivot end of the handle responsive to insertion of the pivot end of the handle into the bracket and into engagement with a retaining portion of the clip, the retaining portion of the clip retaining the pivot end of the handle at the bracket when the pivot end of the handle is engaged with the pivot element of the bracket;

wherein the retaining portion of the clip comprises a pair of retaining legs that are received in the bracket and that engage respective retaining elements at opposite sides of the pivot end of the handle when the pivot end of the handle is inserted into the bracket;

wherein the retaining legs of the clip snap attach at the pivot end of the handle and engage the respective retaining elements responsive to insertion of the pivot end of the handle into the bracket and clip; and wherein the clip is configured to (i) limit movement of the handle relative to the bracket via the retaining portion in a direction along a longitudinal axis of the bracket or handle, (ii) allow pivotal movement of the handle about the pivot element of the bracket, and (iii) allow for removal of the handle from the bracket when the retaining portion is disengaged from the pivot end of the handle.

15. The vehicular exterior door handle assembly of claim 14, wherein the retaining legs are biased toward one another so as to retain the pivot end of the handle via engagement with the retaining element at the respective side of the pivot end of the handle.

16. The vehicular exterior door handle assembly of claim 15, wherein the retaining legs flex away from one another as the pivot end of the handle is inserted into the bracket and clip and move toward one another to engage the retaining elements as the pivot end of the handle is further inserted into the bracket.

17. The vehicular exterior door handle assembly of claim 16, wherein the clip comprises a center portion from which the retaining legs extend, and wherein a pair of grasping tabs extend from the center portion in a direction opposite from the retaining legs, and wherein a user can move the retaining legs away from one another to disengage the retaining legs from the retaining elements of the pivot end of the handle by moving the grasping tabs toward one another.

18. The vehicular exterior door handle assembly of claim 17, wherein the bracket has a pair of channels for receiving the retaining legs when the retaining legs are moved away from one another to provide clearance between the separated retaining legs and the retaining elements at the pivot end of the handle.

19. The vehicular exterior door handle assembly of claim 18, wherein the retaining elements comprise protrusions that protrude from opposite sides of the pivot end of the handle.

20. The vehicular exterior door handle assembly of claim 19, wherein an engaging surface of each of the retaining legs is curved and an engaging surface of each of the protrusions is correspondingly curved, and wherein, with the retaining legs engaged with the protrusions, the curved engaging surfaces of the retaining legs engage the correspondingly curved engaging surfaces of the protrusions to allow for pivotal movement of the handle while limiting movement of the handle in the direction along the longitudinal axis of the bracket or handle.

21. The vehicular exterior door handle assembly of claim 14, wherein the clip further comprises a pair of clip attaching tabs and the bracket further comprises a pair of corresponding bracket attaching tabs, and wherein the clip is snap attached at the bracket via the clip attaching tabs engaging the corresponding bracket attaching tabs.

22. A method for assembling a vehicular exterior door handle assembly, the method comprising:

providing a bracket configured to mount at an exterior door handle region of a vehicular door, the bracket having a pivot element;

providing a handle, the handle having a pivot end and a pull end opposite the pivot end, wherein the handle, with the bracket mounted at the exterior door handle region of the vehicular door, is configured to actuate a latch mechanism for opening the vehicular door;

providing a clip at the bracket;

detachably attaching the handle at the bracket by inserting the pivot end of the handle into the bracket and into engagement with a retaining portion of the clip such that (i) the pivot end of the handle engages the pivot element of the bracket and (ii) the retaining portion of the clip engages the pivot end of the handle and retains the pivot end of the handle at the bracket; and wherein, with the clip engaged with the pivot end of the handle, the clip (i) limits movement of the handle relative to the bracket in a direction along a longitudinal axis of the bracket or handle, (ii) allows pivotal movement of the handle about the pivot element of the bracket, and (iii) allows for removal of the handle from the bracket.

23. The method of claim 22, wherein the step of inserting the pivot end of the handle into the bracket and into engagement with the retaining portion of the clip further comprises snap attaching the retaining portion of the clip at the pivot end of the handle responsive to insertion of the pivot end of the handle into the bracket and clip.

24. The method of claim 22, wherein the retaining portion of the clip comprises a pair of retaining legs, and wherein the step of providing the clip at the bracket comprises receiving the retaining legs in the bracket such that the retaining legs engage opposite sides of the pivot end of the handle when the pivot end of the handle is inserted into the bracket.

25. The method of claim 24, wherein the legs of the pair of retaining legs are biased toward one another, and wherein the step of inserting the pivot end of the handle into the bracket and into engagement with the retaining portion of the clip comprises inserting the pivot end of the handle between the retaining legs such that the retaining legs of the clip engage respective retaining elements at opposite sides of the pivot end of the handle.

26. The method of claim 25, wherein the clip comprises (i) a center portion from which the retaining legs extend, and (ii) a pair of grasping tabs extend from the center portion in a direction opposite from the retaining legs, the method further comprising the step of moving the grasping tabs of the clip toward one another so as to move the retaining legs away from one another to disengage the retaining legs from the retaining elements of the handle.

27. The method of claim 26, wherein the step of moving the grasping tabs toward one another so as to move the retaining legs away from one another comprises moving the retaining legs into respective channels of the bracket that receive the retaining legs when the retaining legs are moved away from one another to provide clearance between the separated retaining legs and the retaining elements at the pivot end of the handle.

28. The method of claim 22, wherein the clip further comprises a pair of clip attaching tabs and the bracket further comprises a pair of corresponding bracket attaching tabs, and wherein the step of providing the clip at the bracket comprises snap attaching the clip at the bracket via the clip attaching tabs engaging the corresponding bracket attaching tabs.

\* \* \* \* \*